(12) United States Patent
Landry

(10) Patent No.: US 6,489,390 B1
(45) Date of Patent: Dec. 3, 2002

(54) FLAME RETARDANTS AND FLAME RETARDANT COMPOSITIONS FORMED THEREWITH

(75) Inventor: Susan D. Landry, Baton Rouge, LA (US)

(73) Assignee: Albemarle Corporation, Richmond, VA (US)

( * ) Notice: Subject to any disclaimer, the term of this patent is extended or adjusted under 35 U.S.C. 154(b) by 0 days.

(21) Appl. No.: 09/861,348

(22) Filed: May 18, 2001

(51) Int. Cl.[7] .............................. C08K 5/03; C08K 5/02; C08K 3/34; C09K 21/02; C09K 21/08; C09K 21/14

(52) U.S. Cl. .................. 524/467; 524/469; 524/492; 524/464; 252/609

(58) Field of Search .................... 252/609; 524/464, 524/465, 466, 467, 468, 469, 492

(56) References Cited

U.S. PATENT DOCUMENTS

| | | | |
|---|---|---|---|
| 2,822,244 A | 2/1958 | Cornely | 23/174 |
| 2,882,243 A | 4/1959 | Milton | 252/455 |
| 2,995,423 A | 8/1961 | Breck et al. | 23/113 |
| 2,996,358 A | 8/1961 | Milton | 23/113 |
| 3,008,803 A | 11/1961 | Milton | 23/113 |
| 3,010,789 A | 11/1961 | Milton | 23/113 |
| 3,011,869 A | 12/1961 | Breck et al. | 23/113 |
| 3,102,853 A | 9/1963 | Skarstrom et al. | 208/211 |
| 3,130,007 A | 4/1964 | Breck | 23/113 |
| 3,216,789 A | 11/1965 | Breck et al. | 23/113 |
| 3,624,024 A | 11/1971 | Caldwell et al. | |
| 4,000,114 A | 12/1976 | Gordon et al. | |
| 4,010,219 A | 3/1977 | Aoyama et al. | |
| 4,067,930 A | 1/1978 | Versnel et al. | |
| 4,089,912 A | 5/1978 | Levek et al. | |
| 4,301,058 A | 11/1981 | Neukirchen et al. | |
| 4,530,880 A | * 7/1985 | Taniuchi et al. | 428/402 |
| 4,632,951 A | * 12/1986 | Fuhr et al. | 524/204 |
| 4,780,496 A | * 10/1988 | Termine et al. | 524/373 |
| 5,149,735 A | * 9/1992 | Bressan et al. | 524/450 |
| 5,171,757 A | * 12/1992 | Stobby et al. | 521/85 |
| 5,216,059 A | * 6/1993 | Atwell et al. | 524/376 |
| 5,281,648 A | * 1/1994 | Doucet et al. | 524/411 |
| 5,387,636 A | * 2/1995 | Landry et al. | 524/404 |
| 5,391,611 A | * 2/1995 | Funayama et al. | 524/508 |
| 5,401,787 A | * 3/1995 | Tonyali | 524/101 |
| 5,475,035 A | * 12/1995 | Park et al. | 521/79 |
| 5,639,799 A | * 6/1997 | Books et al. | 521/79 |
| 6,008,283 A | * 12/1999 | Rose et al. | 524/411 |

FOREIGN PATENT DOCUMENTS

| | | |
|---|---|---|
| CA | 1155574 | 10/1983 |
| JP | 673268 | 3/1994 |

* cited by examiner

Primary Examiner—Joseph D. Anthony
(74) Attorney, Agent, or Firm—Edgar E. Spielman, Jr.

(57) ABSTRACT

The flame retardant additive compositions comprise (a) one or more bromocycloaliphatic flame retardants; (b) one or more bromoaromatic flame retardants; and (c) one or more synthetic zeolites. Flame retardant polymer compositions comprising at least one thermoplastic polymer such as HIPS with which has been blended, singly and/or in one or more combinations, a flame retardant amount of at least (a), (b), and (c) have a very desirable balance of properties.

13 Claims, No Drawings

FLAME RETARDANTS AND FLAME RETARDANT COMPOSITIONS FORMED THEREWITH

TECHNICAL FIELD

This invention relates to additive compositions that serve as flame retardants and that have the capability, when blended with suitable thermoplastic polymers, of providing thermoplastic polymer compositions having a balance of excellent properties in addition to flame resistance. This invention also relates to the resultant flame retarded polymer compositions.

BACKGROUND

Over the years much effort has been devoted to the discovery and development of effective flame retardants for use in thermoplastic polymers. While in many cases effective flame retardancy can be achieved, one or more other properties of the resultant polymer compositions in which the flame retardant is used are often sacrificed. For example, significant loss may occur in the thermal stability, the impact, tensile, or flexural strength properties, the melt flow characteristics, or the recyclability of polymer processing residues.

Thus a welcome contribution to the art of would be the provision of new additive compositions having the capability, when blended with suitable thermoplastic polymers, of providing thermoplastic polymer compositions having a balance of excellent properties in addition to flame resistance. This invention is deemed to constitute such a contribution.

BRIEF SUMMARY OF THE INVENTION

Provided by this invention is a flame retardant additive composition which comprises: (a) at least one bromocycloaliphatic flame retardant; (b) at least one bromoaromatic flame retardant; and (c) at least one synthetic zeolite. Also provided by this invention is a flame retardant polymer composition comprising at least one thermoplastic polymer which contains at least polymerized ethylenic linkages therein, with which polymer has been blended at least (a) one or more bromocycloaliphatic flame retardants; (b) one or more bromoaromatic flame retardants; and (c) one or more synthetic zeolites, (a), (b), and (c) being blended with said thermoplastic polymer individually or in any combination of at least any two or at least any three of (a), (b) and (c).

Other embodiments and features of this invention will be still further apparent from the ensuing description, accompanying drawings, and appended claims.

FURTHER DETAILED DESCRIPTION OF THE INVENTION

Preferred bromocycloaliphatic flame retardant compounds for use in this invention have a plurality of bromine atoms directly bonded to a cycloaliphatic ring. Non-limiting examples of such flame retardants include pentabromocyclohexane, pentabromochlorocyclohexane, hexabromocyclohexane, 1,2-dibromo-4-(1,2-dibromoethyl)cyclohexane, tetrabromocyclooctane, hexabromocyclooctane, hexabromocyclododecane, and analogous bromine-containing cycloaliphatic compounds having at least two, and preferably at least four, bromine atoms directly bonded to a cycloaliphatic ring system. Optionally, the bromocycloaliphatic flame retardant compound also has one or more chlorine atoms in the molecule. The cycloaliphatic ring can have one or more alkyl side chains which can, but need not, be substituted by one or more bromine or chlorine atoms. Mixtures of two or more such compounds can be used, and the components of such mixtures can be in any proportions relative to each other. Most preferred in the practice of this invention is 1,2,5,6,9,10-hexabromocyclododecane, which is a commercially-available flame retardant.

The one or more bromoaromatic flame retardants used in the practice of this invention can contain a single aromatic ring or two or more aromatic rings in the molecule, and preferably have a plurality of bromine atoms directly bonded to at least one aromatic ring. These compounds may also contain one or more chlorine atoms in the molecule, although it is preferred that all of the halogen atoms in the compound be bromine atoms. The aromatic ring(s) may in turn have one or more alkyl substituents which may themselves be substituted by one or more bromine or chlorine atoms. Among suitable bromoaromatic flame retardants having a single aromatic ring in the molecule are such non-limiting examples as 1,3,5-trimbromobenzene, 1,2,4-tribromobenzene, 1,2,4,5-tetrabromobenzene, 2,3,5,6-tetrabromo-p-xylene, pentabromobenzene, pentabromochlorobenzene, hexabromobenzene, and similar bromoaromatic hydrocarbons having at least 3 and preferably at least 4 bromine atoms in the molecule, at least two of which are bonded to the aromatic ring itself. These mononuclear polybromoaromatics preferably contain carbon, bromine, and optionally hydrogen and/or chlorine atoms in the molecule.

More preferred bromoaromatic compounds contain at least two polybromoaromatic groups in the molecule which may be fused ring compounds or compounds in which the aromatic groups are bonded together through (i) a carbon-to-carbon bond from one aromatic ring to another, (ii) a divalent oxygen atom (—O—), (iii) an alkylene group having in the range of 1 to 3 carbon atoms, e.g., methylene (—$CH_2$—), ethylene (—$CH_2CH_2$—), ethylidene, 2,2-propylidene, etc., or (iv) bisimide functionality. Thus these compounds typically contain carbon, bromine, and optionally hydrogen, ether oxygen, thioether sulfur, imido nitrogen atoms bonded to carbonyl groups, and/or chlorine atoms in the molecule. Non-limiting examples of such flame retardants include perbromobiphenyl, perbromonaphthalene, bis(tetrabromophenyl)ether, bis(pentabromophenyl)ether, bis(pentabromophenyl)thioether, bis(pentabromophenyl)methane, 1,1-bisrpentabromophenyl)ethane, 1,2-bis(pentabromophenyl)ethane, 1,3-bis(pentabromophenyl)propane, tetradecabromodiphenoxybenzene, ethylenebistetrabromophthalimide, and analogous compounds. Bis(pentabromophenyl)ether and 1,2-bis(pentabromophenyl)ethane are preferred bromoaromatic compounds for use in this invention.

Various synthetic zeolites can be used including the following: Zeolites A, X, M, F, B, H, J, W, Y, and L described respectively in U.S. Pat. Nos. 2,822,243; 2,822,244; 2,995,423; 2,996,358; 3,008,803; 3,010,789; 3,011,869; 3,102,853; 3,130,007; and 3,216,789, respectively. Still other synthetic zeolites are known, such as ZSM-5, and these can be used. In all cases, the zeolite should be used in the form of a fine dry powder, free of lumps or clumps. From the cost-effectiveness standpoint zeolite-A is a preferred material. In a preferred embodiment, the selected zeolite is calcined before use in order to reduce its water content without materially disrupting its physical structure or average pore size. For example, zeolite-A typically contains about 18.5% water, and calcining can prove useful in reducing this water content, thereby increasing its usefulness in the compositions of this invention. Other zeolites such as zeolite-X which typically contains about 24% water, and zeolite-Y which has a typical water content of about 25% may also be improved for use in this invention by calcining them prior to use to reduce their water contents but without destroying their structure. An advantage of zeolite ZSM-5 is its normal low content of water, about 5%.

The relative proportions among (a) at least one bromocycloaliphatic flame retardant; (b) at least one bromoaromatic flame retardant; and (c) at least one synthetic zeolite can be varied. However typically in the range of about 15 to about 50 wt %, and preferably in the range of about 20 to about 40 wt %, of this mixture is one or more components of (a), typically in the range of about 35 to about 70 wt %, and preferably in the range of about 45 to about 65 wt %, of this mixture is one or more components of (b), and typically in the range of about 5 to about 25 wt %, and preferably in the range of about 7 to about 20 wt %, of this mixture is one or more components of (c), with the total of (a), (b), and (c) being 100 wt %. Particularly preferred relative proportions are about 30–40 wt % of (a), about 50–55 wt % of (b), and about 8–15 wt % of (c), again with the total of (a), (b), and (c) being 100 wt %. It will be understood that the foregoing 100 wt % values just referred to relate to the combination of (a), (b), and (c)—other flame retardants which do not detract materially from the effectiveness of the combination of(a), (b), and (c) can also be present independently of this 100% value. In other words, the total of 100% is a way of expressing the relative proportions of components (a), (b), and (c) only. Other flame retardant components, if used, are not to be included within this total of 100%.

The thermoplastic polymer compositions to which this invention is especially adapted are thermoplastic polymers having polymerized ethylenic linkages. By this is meant that the structure of the polymer includes polymer units formed from one or more monomers having a polymerizable terminal $CH_2=CR-$ group which enters into the formation of the polymer. Such polymers are typified by (i) polyolefin polymers, (ii) vinylaromatic polymers, (iii) functionally-substituted alpha-olefin polymers, and (iv) elastomers derived at least in part from diene monomers copolymerized with one or more monomers of (i), (ii), and/or (iii). Polyolefin polymers are formed by homopolymerization or copolymerization of alpha-olefin monomers having in the range of 2 to about 8 carbon atoms, non-limiting examples of which are polyethylene, polypropylene, polybutene, polyisobutylene, and copolymers such as ethylene-propylene copolymers, and ethylene copolymerized with one or more such monomers as 1-pentene, 3-methyl-i-butene, 1-hexene, 4-methyl-i-pentene, 1-heptene, 1-octene, or analogs thereof. The vinylaromatic polymers (also sometimes referred to as styrenic polymers) are homopolymers or copolymers formed from vinylaromatic monomers having 8 to about 16 carbon atoms per molecule, such as styrene, 2-methylstyrene, 3-methylstyrene, 4-methylstyrene, 2,4-dimethylstyrene, alpha-methylstyrene, 4-tert-butylstyrene, 3,5-diethylstyrene, 2,4,5-trimethylstyrene, vinylnaphthalene, or analogs thereof. Functionally-substituted alpha-olefin polymers which may be used in the practice of this invention are copolymers of at least one 1-olefin and/or styrenic monomer and at least one copolymerizable carboxylic acid, carboxylic acid ester and/or nitrile, non-limiting examples of which include ethylene-acrylic acid copolymer, ethylene-vinylacetate copolymer, ethylene-acrylonitrile copolymer, ABS, MABS, SAN, and similar materials. Elastomers derived at least in part from polymerized diene monomers which may be used in the practice of this invention include elastomeric terpolymers of ethylene, propylene, and at least one diene such as norbomadiene or hexadiene, butadiene-styrene elastomers, butadiene-acrylonitrile elastomers, and similar materials.

It is contemplated that it may be possible to form flame retardant compositions of this invention using polymer blends containing substantial proportions of one or more styrenic polymers such as polyphenylene ether/polystyrene, polyphenylene ether/HIPS, or aromatic polycarbonate/ABS blends.

Preferred substrate or host polymers are the polyolefin homopolymers and copolymers, especially those based in whole or in part on ethylene or propylene. More preferred are the vinylaromatic polymers. These can be homopolymers, copolymers or block polymers and such polymers can be formed from such vinylaromatic monomers as styrene, ring-substituted styrenes in which the substituents are one or more $C_{1-6}$ alkyl groups and/or one or more halogen atoms, such as chlorine or bromine atoms, alpha-methylstyrene, ring-substituted alpha-methylstyrenes in which the substituents are one or more $C_{1-6}$ alkyl groups and/or one or more halogen atoms, such as chlorine or bromine atoms, vinylnaphthalene, and similar polymerizable styrenic monomers—i.e., styrenic compounds capable of being polymerized by means of peroxide or like catalysts into thermoplastic resins. Homopolymers and copolymers of simple styrenic monomers (e.g., styrene, p-methylstyrene, 2,4-dimethylstyrene, alpha-methyl-styrene, p-chloro-styrene, etc.) are preferred from the standpoints of cost and availability.

Impact-modified polystyrenes (IPS) that are preferably used may be medium-impact polystyrene (MIPS), high-impact polystyrene (HIPS), or blends of HIPS and GPPS (sometimes referred to as crystal polystyrene). These are all conventional materials. The rubber used in effecting impact modification is most often, but need not be, a butadiene rubber. High-impact polystyrene or blends containing a major amount (greater than 50 wt %) of high-impact polystyrene together with a minor amount (less than 50 wt %) of crystal polystyrene are among preferred substrate or host polymers. Particularly preferred thermoplastic polymers in which the flame retardant additive compositions of this invention are used are the high-impact polystyrene polymers (HIPS), whether or not they contain crystal polystyrene.

The quantity of the (a), (b) and (c) additive components in the thermoplastic polymer composition having polymerized ethylenic linkages will vary somewhat depending on such factors as the identity and relative proportions of the particular components of (a), (b) and (c) used, the identity of the thermoplastic polymer in which these components are being used, the amount and type of flame retardant synergist, if any, being used, and the amount of flame retardancy desired in the finished blend. In all cases however the quantity used must be a flame retardant amount, i.e., an amount that increases the flame retardancy in the particular thermoplastic polymer composition being flame retarded. In preferred embodiments a flame retardant amount is an amount which provides test specimens giving at least a V-2 rating in the standard UL test procedure as described in UL-94 Standard for Tests for Flammability of Plastic Materials for Parts in Devices and Appliances. Without limiting the scope of this invention, the amount of the flame retardant compositions of this invention proportioned as above in the substrate or host polymer will usually be such as to provide a bromine content (as Br) in the range of about 2 to about 8 wt %, more usually a bromine content of about 3 to about 6 wt %, such as about 4 wt % especially in the case of some types of HIPS.

The additive and polymer compositions of this invention can contain additional components. One preferred additional component is one or more flame retardant synergists -such as, for example, antimony trioxide, antimony pentoxide, antimony phosphate, $KSb(OH)_6$, $NH_4SbF_3$, sodium antimonate, potassium antimonate, zinc antimonate, nickel antimonate, KSb tartrate, zinc borate, or a mixed oxide of boron and zinc which can contain water of hydration, or which can be anhydrous, such as dodecaboron tetrazinc docosaoxide heptahydrate ($4ZnO.6B_2O_3.7H_2O$); zinc borate monohydrate ($4ZnO.B_2O_3.H_2O$); and anhydrous zinc borate ($2ZnO.3B_2O_3$). Amounts of synergist(s) in the range of about 10 to about 40 wt % based on the total weight of (a), (b), and (c) will usually suffice. Preferred amounts are in the range of about 20 to about 40 wt % based on the total weight of (a), (b), and (c).

Another preferred type of additive is at least one tin-based thermal stabilizer, such as an alkyltin mercaptoalkanoate. It is believed on the basis of available information that such compounds have two alkyl groups and at least one mercaptoalkanoate group bonded to an atom of tin. According to this hypothesis, the compounds may exist either as a cyclic compound, as a non-cyclic compound, or as a mixture of such compounds. The preferred alkyltin mercaptoalkanoates are those which are solids at room temperature as they have no adverse plasticizing effect upon the styrenic polymer compositions of this invention. However, for some applications liquid alkyltin mercaptoalkanoates can be used. Preferred solid materials that are available from commercial sources include, for example, Bärostab M36, which is described by its manufacturer as a butyltin mercaptopropionate, Bärostab OM36, which is described by the manufacturer as an octyltin mercaptopropionate, and equivalent materials. Products like Bärostab M36 have also been variously described by one manufacturer as a butyltin mercaptide, butyltin (3-mercaptopropionate), and dibutyltin (3-mercaptopropionate). It is indicated by that manufacturer to contain approximately 3 5% wt % of tin, and it melts at about 120–123 ° C. The manufacturer has also referred to Bärostab OM36 as an octyltin mercaptide, a dioctyltin thioester, and as octyltin mercaptopropionate, and has indicated that it contains approximately 26.5 wt % of tin. It is reasonable to expect that compounds of this type with other alkyl groups (e.g., $C_{5-7}$, and $C_9$ and above) can be produced that exist as solids at room temperature. Compounds which are understood to be equivalent or suitably similar to Bärostab M36 from Barlocher GmbH, are Tinstab BTS 261 from Akeros Chemicals, Thermolite 35 from Elf Atochem S. A., and Prosper M36 or Okstan M36, from Comtin. The thermal decomposition temperature of Tinstab BTS 261 is reported to be 317° C. Amounts of such tin-based thermal stabilizers are typically in the range of about 4 to about 9 wt % based on the total weight of (a), (b), and (c). Preferred amounts are in the range of about 5 to about 8 wt % based on the total weight of (a), (b), and (c).

Other additives which may be used if desired include, for example, antioxidants, metal scavengers or deactivators, pigments, fillers, impact modifiers, dyes, anti-static agents, processing aids, mold release agents, lubricants, antiblocking agents, other flame retardants, other thermal stabilizers, and similar materials. Such components are usually used in conventional quantities in accordance with customary practice in the industry, or such as may be recommended by the additive manufacturer. Conduct of a few preliminary optimization tests using different proportions of the selected components can also prove useful. Any additive which would materially detract from one or more of the advantageous performance properties of the composition of this invention when devoid of such additive, should not be included in the composition.

When preparing flame-retarded polymer compositions of this invention, the individual components of the flame retardant composition of this invention can be blended separately and/or in subcombinations with the substrate or host polymer in appropriate proportions. However, it is definitely preferable to blend a preformed additive composition of this invention with the polymer as this minimizes the possibility of blending errors, and is a simpler and less time-consuming blending operation.

The additive compositions of this invention can be formulated as powder blends of the additive components using conventional blending apparatus and techniques. Granular blends can be produced using conventional compactors. Alternatively, the components can be melt blended together, with the inclusion, where necessary or appropriate, of some of the substrate polymer in which the additive composition is to blended. Preferred additive uz compositions of this invention are composed of compacted granules of at least above components (a), (b) and (c), such as for example, granules composed of about 30–40 wt % of 1,2,5,6,9,10-hexabromocyclododecane, about 50–55 wt % of bis (pentabromophenyl)ether or 1,2-bis(pentabromophenyl) ethane, and about 8–15 wt % of a synthetic zeolite such as zeolite A, the total of (a), (b), and (c) being 100 wt %. These compositions can also contain one of more flame retardant synergists and one or more tin-based stabilizers proportioned as indicated above, as well as one or more other additives that are useful for improving the properties or processing characteristics of polymers.

Various known procedures can be used to prepare the flame-retardant polymer blends or formulations of this invention. For example the substrate or host polymer and an additive composition of this invention (i.e., a preformed additive composition comprising at least components (a), (b), and (c)) together with whatever suitable auxiliary additive components as may be selected can be mixed in suitable proportions in a powder blender and then melt extruded. Although less preferable, the substrate or host polymer and the individual components (a), (b), and (c) and whatever suitable auxiliary additive components as may be selected can be added separately and/or in subcombinations (i.e., other than in a combination of (a), (b), and (c) of this invention) to the blending apparatus and mixed during and/or subsequent to the additions. Alternatively the materials, preferably comprising a preformed additive composition of this invention comprising at least components (a), (b), and (c) rather than the individual components, can be compounded using an extruder, most preferably a twin-screw extruder. However, other apparatus such as a Buss kneader may be found useful for such compounding. If glass fibers are being used as a component, it is desirable to add the glass fibers at a downstream portion of the extruder in order to avoid excessive glass fiber breakage. The other additive components utilized in the practice of this invention can be added with the polymer in the initial feed port of the extruder or they can be added to the extruder further downstream. The extrudate from the extruder is typically converted into granules or pellets either by cooling strands of the extruding polymer and subdividing the solidified strands into granules or pellets, or by subjecting the extrudate to concurrent die-faced pelletizing and water-cooling or air-cooling.

The compounded polymers of this invention can be processed in conventional ways. For example, the compounds can be transformed into the final articles by appropriate processing techniques such as injection molding, compression molding, extrusion, or like procedures.

The practice and advantages of this invention are illustrated by the following non-limiting Examples.

EXAMPLE 1

A flame retardant composition of this invention is formed by blending together 1,2,5,6,9,10-hexabromocyclododecane, decabromodiphenyl-1,2-ethane, and zeolite-A in proportions of 35:53:12 parts by weight, respectively.

EXAMPLE 2

A flame retardant composition of this invention is formed by blending together 1,2,5,6,9,10-hexabromocyclododecane, decabromodiphenyl-1,1-ethane, and zeolite-A in proportions of 35:53:12 parts by weight, respectively.

EXAMPLE 3

A flame retardant composition of this invention is formed by blending together 1,2,5,6,9,10-hexabromocyclododecane, decabromodiphenyl-1,2-ethane, and zeolite-A in proportions of 38:52:10 parts by weight, respectively.

EXAMPLE 4

A flame retardant composition of this invention is formed by blending together 1,2,5,6,9,10-hexabromocyclododecane, decabromodiphenyl-1,1-ethane, and zeolite-A in proportions of 32:57:11 parts by weight, respectively.

EXAMPLE 5

A flame retardant composition of this invention is formed by blending together 1,2,5,6,9,10-hexabromocyclododecane, decabromodiphenyloxide, and zeolite-A in proportions of 35:53:12 parts by weight, respectively.

EXAMPLE 6

With individual samples of each of the five compositions of Examples 1–5 is blended antimony trioxide in proportions of 1 part by weight antimony trioxide per each 5 parts by weight of the respective compositions of Examples 1–5, to thereby form five $Sb_2O_3$-containing compositions of this invention.

EXAMPLE 7

With individual samples of each of the five compositions of Examples 1–5 is blended anhydrous sodium borate in proportions of 1 part by weight of the sodium borate per each 5 parts by weight of the respective compositions of Examples 1–5, to thereby form five $2ZnO.3B_2O_3$-containing compositions of this invention.

EXAMPLE 8

With individual samples of each of the five compositions of Examples 1–5 are blended antimony trioxide and butyltin mercaptopropionate solids (e.g., Bārostab OM36), in proportions of 1 part by weight of the antimony oxide and 0.35 part by weight of the butyltin mercaptopropionate solids per each 5 parts by weight of the respective compositions of Examples 1–5, to thereby form five compositions of this invention containing a flame retardant synergist and a tin-containing thermal stabilizer.

EXAMPLE 9

Eight flame retardant polymer compositions of this invention are formed having the following respective compositions:
1) HIPS with which is blended 5 wt % of the composition of Example 1.
2) HIPS with which is blended 5 wt % of the composition of Example 2.
3) HIPS with which is blended 5 wt % of the composition of Example 3.
4) HIPS with which is blended 5 wt % of the composition of Example 4.
5) HIPS with which is blended 5 wt % of the composition of Example 5.
6) HIPS with which is blended 6 wt % of the composition of Example 6.
7) HIPS with which is blended 6 wt % of the composition of Example 7.
8) HIPS with which is blended 6.35 wt % of the composition of Example 8.

EXAMPLE 10

The practice and advantages of this invention were demonstrated in a series of tests in which a high-impact polystyrene composition of this invention was prepared and subjected to a number of evaluations. This composition was composed of 93.65 wt % of high-impact polystyrene, 5 wt % of a mixture prepared as in Example 1, 1 wt % of antimony trioxide, 0.1 wt % of Bārostab M36 (Barlocher GmbH), 0.1 wt % Thermolite 42 (Elf Atochem S. A.), and 0.15 wt % Mark 645, a dibutyltin maleate (Witco Corporation). Table 1 summarizes the results of a group of tests to which extruded and injection molded test specimens of this polymer composition (Polymer A) were subjected. Also shown in Table 1 are results of parallel control tests conducted with extruded and injection molded test specimens made from additive-free portions of the same high-impact polystyrene (Polymer B).

TABLE 1

| Property | Polymer A | Polymer B |
|---|---|---|
| UL-94 Rating, 1/8-inch | V-2 | Burn |
| UL-94 Rating, 1/16-inch | V-2 | Burn |
| Melt Flow Index, g/10 min (200° C./5 kg) | 4.6 | 3.8 |
| IZOD Impact Strength, ft-lb/in | 2.2 | 2.4 |
| DTUL, ° C. | 74 | 76 |
| Gloss (60° Angle) | 51 | 53 |

In melt stability determinations by capillary rheometry at 250° C. and a shear rate of 500/second, the viscosity of Polymer A remained at about 115 Pa-s for about 20 minutes and then slowly dropped to about 105 Pa-s after about 33 minutes. Polymer B remained at about 180 Pa-s during the same period of time. Isothermal TGA melt stability determinations at 250° C. under nitrogen showed a 1.6 wt % weight loss for Polymer A after 1 hour. Under the same conditions Polymer B showed a 0.9 wt % weight loss in one hour. Thus Polymer A showed good thermal stability over extended periods.

In another series of evaluations, the high-impact polystyrene composition of this invention (Polymer C) was composed of 92.95 wt % of high-impact polystyrene, 5.7 wt % of a mixture prepared as in Example 1, 1 wt % of antimony trioxide, 0.1 wt % Bärostab M36 (Barlocher GmbH), 0.1 Thermolite 42 (Elf Atochem), and 0.15 wt % Mark 645 (Witco). Table 2 summarizes the results of a group of tests to which extruded and injection molded test specimens of this polymer composition (Polymer C) were subjected. Also shown in Table 2 are results of parallel control tests conducted with extruded and injection molded test specimens made from additive-free portions of the same high-impact polystyrene (Polymer D).

TABLE 2

| Property | Polymer C | Polymer D |
| --- | --- | --- |
| UL-94 Rating, 1/8-inch | V-2 | Burn |
| UL-94 Rating, 1/16-inch | V-2 | Burn |
| Melt Flow Index, g/10 min (200° C./5 kg) | 4.5 | 3.8 |
| IZOD Impact Strength, ft-lb/in | 2.3 | 2.8 |
| DTUL, ° C. | 73 | 74 |
| Vicat Softening Temperature, ° C. (1 kg) | 101 | 103 |
| Tensile Strength, psi × $10^3$ | 3.6 | 3.6 |
| Tensile Modulus, psi × $10^5$ | 3.1 | 3.1 |
| Elongation at Break, % | 36 | 30 |
| Flexural Strength, psi × $10^3$ | 7.3 | 7.0 |
| Flexural Modulus, psi × $10^5$ | 3.1 | 3.0 |

In melt stability determinations by capillary rheometry at 250° C. and a shear rate of 500/second, the viscosity of Polymer C remained at about 149 Pa-s for about 25 minutes and then slowly dropped to about 1135 Pa-s after about 33 minutes. Polymer D remained at about 170 Pa-s during the same period of time. Isothermal TGA melt stability determinations at 250° C. under nitrogen showed an weight loss of about 2.7 wt % for Polymer C after 1 hour. Under the same conditions Polymer D showed a 1 wt % weight loss in one hour.

In injection molding trials conducted at increasing temperatures it was found that at 247° C. no signs of discoloration occurred in Polymer C.

Recyclability tests were conducted in order to assess the extent of change in properties of Polymers C and D during repeated injection molding cycles. Thus after each of four consecutive injection molding cycles the test pieces were ground to a small particle size and then the particles were injection molded again, thus giving 5 repetitions of injection molding on the same polymeric materials. After the first, third and fifth injection moldings, the properties of test specimens from those runs were determined. It was observed that very little change in tensile, flexural, UL-94 LOI, DTUL, or Vicat softening properties occurred in either Polymer C or D after these multiple recycles. Table 3 shows the results of the recyclability tests on Polymers C and D in which property changes were observed.

TABLE 3

| Property | Polymer C | Polymer D |
| --- | --- | --- |
| Melt Flow Index, g/10 min (200° C./5 kg), after 1 pass | 4.5 | 3.8 |
| Melt Flow Index, g/10 min (200° C./5 kg), after 3 passes | 4.8 | 4.1 |
| Melt Flow Index, g/10 min (200° C./5 kg), after 5 passes | 5.1 | 4.1 |
| IZOD Impact Strength, ft-lb/in, after 1 pass | 2.3 | 2.8 |
| IZOD Impact Strength, ft-lb/in, after 3 passes | 2.2 | 2.8 |
| IZOD Impact Strength, ft-lb/in, after 5 passes | 2.0 | 2.6 |
| Color Change after 3 passes, ΔE (relative to color after 1st pass) | 1.9 | 2.4 |
| Color Change after 5 passes, ΔE (relative to color after 1st pass) | 2.9 | 4.0 |

From the foregoing tests with Polymers C and D it was concluded that the composition of Polymer C achieved V-2 ratings at ⅛-inch and 1/16-inch at low loadings, that impact strength and DTUL were very similar to the neat HIPS resin (Polymer D), that the additive combination of this invention increased melt flow, that melt stability by capillary rheometry and isothermal TGA was good over extended periods, and that the composition of this invention has extremely good recyclability characteristics since very little change in flammability, physical properties, and color were observed after five injection molding cycles.

That which is claimed is:

1. A flame retardant polymer composition comprising at least one thermoplastic polymer which contains at least polymerized ethylenic linkages therein, with which said polymer has been blended, one by one and/or in one or more combinations, a flame retardant amount of at least (a) one or more bromocycloaliphatic flame retardants; (b) 1,2-bis(pentabromophenyl)ethane; and (c) one or more synthetic zeolites; with the proviso that (a), (b) and (c) are blended in relative proportions among (a), (b) and (c) in the range of about 20 to 40 wt % of (a), in the range of about 45 to about 65 wt % of (b), and in the range of about 7 to about 20 wt % of (c), with the total of (a), (b) and (c) being 100 wt %.

2. A molded article or shape formed from a composition of claim 1.

3. A composition of claim 1 wherein said relative proportions among (a), (b) and (c) are in the range of about 30 to about 40 wt % of (a), in the range of about 50 to about 55 wt % of (b), and in the range of about 8 to about 15 wt %, of (c), with the total of (a), (b), and (c) being 100 wt %.

4. A composition of any of claim 1 or 3 wherein (a) consists essentially of 1,2,5,6,9,10-hexabromocyclododecane.

5. A composition of claim 4 wherein (c) is zeolite-A.

6. A composition of claim 1 wherein said thermoplastic polymer consists essentially of a high-impact polystyrene.

7. A composition of claim 6, wherein (a), (b) and (c) are blended in relative proportions among (a), (b) and (c) in the range of about 20 to about 40 wt % of (a), in the range of about 45 to about 65 wt % of (b), and in the range of about 7 to about 20 wt %, of (c), with the total of (a), (b), and (c) being 100 wt %.

8. A composition of claim 7 wherein said relative proportions among (a), (b) and (c) are in the range of about 30 to about 40 wt % of (a), in the range of about 50 to about 55 wt % of (b), and in the range of about 8 to about 15 wt %, of (c), with the total of (a), (b), and (c) being 100 wt %.

9. A molded article or shape formed from a composition of claim 6.

10. A composition of any of claim 6, 7, or 8 wherein (a) consists essentially of 1,2,5,6,9,10-hexabromocyclododecane.

11. A composition of claim 10 wherein (c) is zeolite-A.

12. A composition of any of claim 1, 2, 6, 7, or 8 further comprising at least one flame retardant synergist and at least one tin-containing thermal stabilizer.

13. A composition of claim 12 wherein (a) is 1,2,5,6,9,10-hexabromocyclododecane, and (c) is zeolite-A.

* * * * *

UNITED STATES PATENT AND TRADEMARK OFFICE
CERTIFICATE OF CORRECTION

PATENT NO. : 6,489,390 B1 Page 1 of 1
DATED : December 3, 2002
INVENTOR(S) : Susan D. Landry It is certified that error appears in the above-identified patent and that said Letters Patent is hereby corrected as shown below:

Column 10,
Line 58, reads "any of claim 6,7," should read -- any of claim 6,7, --
Line 62, reads "any of claim 1, 2," should read -- any of claims 1, 2, --
Line 62, reads "claim 1, 2, 6, 7," should read -- claims 1, 3, 6, 7, --

Signed and Sealed this

Tenth Day of May, 2005

JON W. DUDAS
*Director of the United States Patent and Trademark Office*